(No Model.)
S. JUNE.
Horse Detacher.
No. 230,285. Patented July 20, 1880.
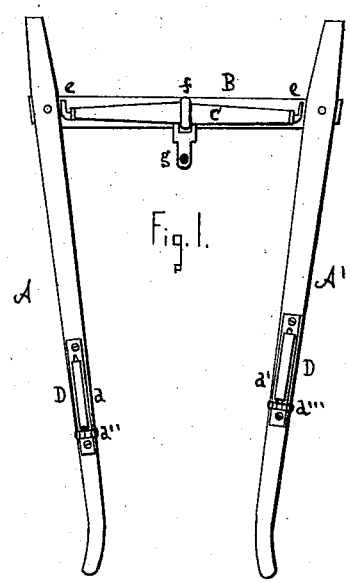
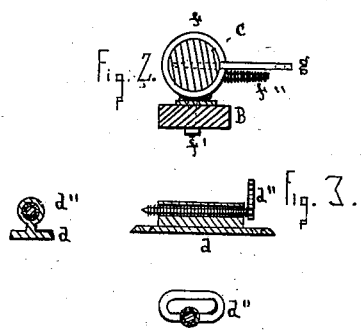
S. J. Parker,
E. A. Marsh,
Witnesses.
Solomon June,
Inventor.

UNITED STATES PATENT OFFICE.

SOLOMON JUNE, OF ITHACA, NEW YORK, ASSIGNOR OF ONE-HALF OF HIS RIGHT TO ALFRED B. DALE, OF SAME PLACE.

HORSE-DETACHER.

SPECIFICATION forming part of Letters Patent No. 230,285, dated July 20, 1880.

Application filed April 23, 1880. (No model.)

*To all whom it may concern:*

Be it known that I, SOLOMON JUNE, of Ithaca, Tompkins county, New York, have invented a new and useful Device for Quickly Detaching Horses from Thills or the Poles of Wagons, of which the following is a specification.

My invention relates to that class of devices used for detaching the traces and the holdbacks; and my objects are, first, to provide for the disengagement of the traces from the whiffle tree or trees, and, second, to make a holdback attachment operating with the traces, which, as soon as the traces are detached, shall be self-operating; and my invention is especially useful in case of a runaway or other cause of alarm, in case of accidents, or in cases where rapid and frequent detachments and attachments are desirable, as in fire-engines, omnibus-teams, and the like. I attain these objects by the mechanism illustrated in the accompanying drawings, in which—

Figure 1 is a view of a pair of thills with my device looking down thereupon. Fig. 2 is a sectional view of my rotating whiffletree. Fig. 3 is a longitudinal section of my holdback slide with a rod in it.

Small detached sketches further illustrate parts thought to need it, and the letters attached indicate the relation for which they are made.

In the figures, A A' are the two thills, and B is the cross-bar holding the whiffletree C, and D D' are the two holdback slides or sockets.

The two trace-hooks $e\ e$ of the whiffletree are clearly seen to be plain hooks, which, when the horse is drawing in the thills, have their outer ends directed rearward, thus holding the traces securely in their places, as is the case with this kind of trace-hook, that is well known in common use.

The whiffletree is made round, at least for its central part, where it goes through a ring, $f$, which ring is held to the cross-bar B by the bolt $f'$ and a lever, $g$, which has two points forked about the ring, and which go into the whiffletree, one on each side of the ring, the ring $f$ and the swivel-bolt $f'$ being made in one part or piece, and constituting the means by which the whiffletree is held to the cross-bar of the thills holding the whiffletree in the ring. This lever projects a little forward toward the horse, and has a hole in its end, in which is attached a strap, by which the whiffletree is rotated when the detachment of the horse is desirable, for by pulling on the strap the whiffletree is partially rotated, and thus the ends of the trace-hooks are inclined forward and the traces drop off of the whiffletree. This description holds good of both single and double teams, with wagons with thills or poles, for each whiffletree is made as shown, and a two-parted strap or cord acts on both.

There is next to be shown the mechanism by which the holdbacks are released. This I accomplish by attaching socket-plates $d\ d'$ to the top of the thills, in which, when in use, are the loose rods $d''\ d'''$. As the traces fall off of the hooks these rods slide out of the sockets, and thus the horse is released. The front ends of these rods are made into any desirable shape; but it is apparent that by the form shown of loops they are made into forms— first, a loop that is a substitute for the usual one that holds up the thills; second, a plain loop to which the usual buggy or one-horse holdback-strap is attached; or, third, other similar modifications for the attachment of the rod-loop to the harness.

It needs but to state that to the front end of the pole of a two-horse wagon I attach a socket and looped slide-rod, made as shown, and to the loop I attach the neck-yoke or the usual breast-straps, when the socket and its slide-rod acts precisely as it does on the thills, and makes an excellent two-horse adjustment in connection with the whiffletrees described.

As minor matters, will be seen a stop, $f'''$, that checks the descent anteriorly of the lever $g$ and the winding of the same with cord, or the casing it in leather or rubber to prevent rattling as the buggy is driven. So, also, the sockets may be lined with leather or rubber to prevent rattling noises as the wagon is used; or the rods may be thus wound with cord, as shown, or cased in leather or rubber for the same purpose.

I am aware that various appliances and devices have been made for the same purpose as my invention, both patented and unpatented, the history in full of which I cannot give. These I do not claim; but What I do consider as my invention and claim is as follows:

1. The swivel-bolt $f'$, with ring $f$ made on its upper end, in combination with the lever $g$, when the base of the lever is forked and attached to the whiffletree on each side of the ring, thus holding the ring and whiffletree to each other, as set forth.

2. The swivel-bolt $f'$, with ring $f$ on its upper end, in combination with the lever $g$, extending anteriorly and resting on the stop $f''$ when the horse is attached, and which lever is drawn upward and backward by a cord or strap when the horse is detached, as described.

3. The device described, consisting of the swivel-bolt $f'$, ring $f$, forked lever $g$, stop $f'''$, trace-hooks $e$, and the whiffletree C, in combination with the holdback-sockets D and their slide-rods, each part being constructed and used as set forth.

SOLOMON JUNE.

Witnesses:
S. J. PARKER,
E. A. MARSH.